(12) United States Patent
Jang et al.

(10) Patent No.: US 7,075,694 B2
(45) Date of Patent: Jul. 11, 2006

(54) APPARATUS AND METHOD FOR AUTOMATICALLY CORRECTING BIAS VOLTAGE FOR CARRIER SUPPRESSED PULSE GENERATING MODULATOR

(75) Inventors: Youn Seon Jang, Daejeon (KR);
Kwang Joon Kim, Daejeon (KR);
Jyung Chan Lee, Daejeon (KR);
Seung Il Myong, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 34 days.

(21) Appl. No.: 10/863,741

(22) Filed: Jun. 7, 2004

(65) Prior Publication Data

US 2005/0128555 A1    Jun. 16, 2005

(30) Foreign Application Priority Data

Dec. 12, 2003    (KR)    ................ 10-2003-0090617

(51) Int. Cl.
*G02B 26/00* (2006.01)
(52) U.S. Cl. .................................... 359/239
(58) Field of Classification Search ................ 359/239
See application file for complete search history.

(56) References Cited

U.S. PATENT DOCUMENTS

| 5,003,624 A | 3/1991 | Terbrack et al. |
| 5,495,359 A * | 2/1996 | Gertel et al. ................. 359/245 |
| 6,204,954 B1 * | 3/2001 | Nagarajan .................... 359/279 |
| 6,317,247 B1 | 11/2001 | Yang et al. |
| 6,580,544 B1 | 6/2003 | Lin et al. |

OTHER PUBLICATIONS

Journal of Lightwave Technology, vol. 20, No. 4, Aprl. 2002, pp. 598-607.
Electronics Letters, May 23, 1991, vol. 27, No. 11, pp. 943-945.

\* cited by examiner

*Primary Examiner*—Hung Xuan Dang
*Assistant Examiner*—Joseph Martinez
(74) *Attorney, Agent, or Firm*—Blakely, Sokoloff, Taylor & Zafman

(57) ABSTRACT

The present invention relates to an apparatus and method for automatically correcting a bias voltage for a carrier suppressed pulse generating modulator using the phase distribution of the output pulses, which automatically detects an optimal bias voltage for the carrier suppressed pulse generating modulator and stabilizes the bias voltage.

In the bias voltage automatic correction method and apparatus of the present invention, an optimal bias voltage for the modulator is set to a bias voltage that is obtained when mean power of an optical signal output from the modulator is highest. The varying direction of the bias voltage is detected on the basis of the phase variations in the output optical signal of the modulator according to the bias voltage variations is detected, and the bias voltage is corrected oppositely to the varying direction of the bias voltage.

9 Claims, 5 Drawing Sheets

TRANSMISSIVITY OF
FIRST EXTERNAL
MODULATOR 101

(a) POWER (b)

(c) POWER (d)

(e) POWER (f)

APPARATUS AND METHOD FOR AUTOMATICALLY CORRECTING BIAS VOLTAGE FOR CARRIER SUPPRESSED PULSE GENERATING MODULATOR

BACKGROUND OF THE INVENTION

1. Field of the Invention

The present invention relates, in general, to an apparatus and method for automatically correcting a bias voltage for a carrier suppressed pulse generating modulator using the phase distribution of the output pulse, which performs automatic control to automatically detect an optimal bias voltage for the carrier suppressed pulse generating modulator used in a carrier suppressed return-to-zero modulator and to maintain the optimal bias voltage during the operation of the modulator.

2. Description of the Related Art

Generally, in a long distance optical transmission system using Wavelength Division Multiplexing (WDM), the modulation of a transmission signal has been performed by a Non-Return-to-Zero (NRZ) modulation method using a Mach-Zehnder type external modulator. An external modulator used in this case exhibits a phenomenon (a DC bias drift) in which a transfer curve moves laterally due to the variations in a temperature, etc. Accordingly, an optical transmission signal is distorted due to the DC bias drift, so that an extinction ratio is deteriorated and unstable power is output, thus deteriorating the performance of the system. Therefore, the technology of automatically correcting a bias voltage is required so as to output a stable signal regardless of the temperature variations.

Currently, various technologies related to a method or an apparatus for correcting bias voltages for modulators based on NRZ modulation have been proposed.

However, recently, as a transmission rate of an optical transmission network increases and an interval between channels narrows, various modulation schemes based on Return-to-Zero (RZ) modulation instead of conventional NRZ modulation have been researched.

A Carrier Suppressed Return-to-Zero (CSRZ) modulation (hereinafter referred to as "CSRZ modulation") scheme shown in FIG. 1 is one of optical modulation schemes, which have been newly researched.

Referring to FIG. 1, the CSRZ modulator includes a Mach-Zehnder-type first external modulator (Mach-Zehnder Interferometer 1: MZI1) 101 for receiving a laser beam from a laser light source to generate carrier suppressed pulses, and a second external modulator (Mach-Zehnder Interferometer 2: MZI2) 102 with a single port for modulating the carrier suppressed pulses output from the first external modulator 101 using NRZ modulation.

A bias voltage of the first external modulator 101 is located at the bottom point of its transfer curve as indicated by reference numeral S201 in a graph of FIG. 2, so that the laser beam is modulated at a voltage amplitude of $2V\pi$ in synchronization with signal clock/2. As a result of the modulation, the laser beam is converted into a pulse signal indicated by reference numeral S202 of FIG. 2, and a phase difference of 180 degrees exists between neighboring pulses. At this time, referring to the spectrum of the pulse signal, a carrier is suppressed and is not shown.

The pulse signal S202 is applied to the second external modulator 102. A bias voltage of the second external modulator 102 is located at the point indicated by reference numeral S203 of FIG. 2, that is, the mid-point of the slope of its transfer curve, so that the second external modulator 102 performs an ON/OFF function of gating a signal on and off in response to a data signal, that is, a NRZ modulating function. As a result of the NRZ modulation, a pulse signal carrying data is generated as indicated by reference numeral S204.

There is no problem even though the second external modulator 102 employs a conventional bias control scheme without change; however, the first external modulator 101 for generating the carrier suppressed pulse cannot employ a bias voltage stabilizing method, which was used in the conventional NRZ modulation, without change in accordance with the operating characteristics thereof. Therefore, there is required a new scheme capable of performing stable bias control with respect to the first external modulator 101 employing the CSRZ modulation.

SUMMARY OF THE INVENTION

Accordingly, the present invention has been made keeping in mind the above problems occurring in the prior art, and an object of the present invention is to provide an apparatus and method for automatically correcting a bias voltage for a carrier suppressed pulse generating modulator using the phase distribution of the output pulse, which automatically detects an optimal bias voltage for the carrier suppressed pulse generating modulator used in CSRZ modulation, and stabilizes the bias voltage.

In order to accomplish the above object, the present invention provides a method of automatically correcting a bias voltage for a modulator used to generate carrier suppressed pulses, the modulator receiving a continuous laser beam and generating the carrier suppressed pulses, the method comprising the steps of a) setting an optimal bias voltage for the modulator to a bias voltage that is obtained when mean power of an optical signal output from the modulator is highest; b) applying the set optimal bias voltage to the modulator; and c) detecting variations in phase of the output optical signal of the modulator according to variations in the bias voltage during an operation of the modulator, and maintaining the set optimal bias voltage by increasing or decreasing the bias voltage applied to the modulator on the basis of the detected phase variations, thus stabilizing the bias voltage.

Preferably, in the bias voltage automatic correction method, the step a) may comprise the steps of a1) applying the bias voltage to the modulator while varying the bias voltage from a minimum value to a maximum value; a2) detecting mean power of optical signals output from the modulator with respect to the varied bias voltages; and a3) setting the optimal bias voltage to a bias voltage that is obtained when the mean power is highest.

Preferably, in the bias voltage automatic correction method, the step c) may be performed so that the phase variations in the output optical signal of the modulator according to the variations in the bias voltage is detected on the basis of variations in power of an interference signal between the output optical signal of the modulator and the laser beam.

Preferably, in the bias voltage automatic correction method, the step c) may comprise the steps of c1) setting a reference value to mean power of the interference signal between the output optical signal of the modulator and the laser beam that is obtained when the optimal bias voltage set at step a) is applied; and c2) adjusting the bias voltage so that the mean power of the interference signal between the output optical signal of the modulator and the laser beam is maintained at the set reference value during the operation of the modulator.

Preferably, in the bias voltage automatic correction method, the step c2) may comprise the steps of c2-1) allowing the output optical signal of the modulator to interfere with the laser beam to generate the interference signal during the operation of the modulator, and detecting the mean power of the interference signal; c2-2) comparing the detected mean power of the interference signal with the set reference value; c2-3) decreasing the bias voltage applied to the modulator by a unit value if the detected mean power is less than the reference value as a result of the comparison; c2-4) increasing the bias voltage applied to the modulator by a unit value if the detected mean power is greater than the reference value as a result of the comparison; and c2-5) maintaining the bias voltage applied to the modulator if the detected mean power is equal to the reference value as a result of the comparison; wherein steps c2-1) to c2-5) are repeatedly performed during the operation of the modulator.

In addition, the present invention provides an apparatus for automatically correcting a bias voltage for a modulator used to generate carrier suppressed pulses, the modulator receiving a continuous laser beam and generating the carrier suppressed pulses, comprising splitting means for dividing an optical signal output from the modulator; first optical power detecting means for detecting mean power of the optical signal output from the modulator through the splitting means; and control means for examining values detected by the first optical power detecting means while varying the bias voltage applied to the modulator from a minimum value to a maximum value, and then applying a bias voltage, obtained when the detected value is highest, to the modulator as the optimal bias voltage.

Preferably, the bias voltage automatic correction apparatus may further comprise optical coupling means for allowing the laser beam applied to the modulator to interfere with the optical signal output from the splitting means; and second optical power detecting means for detecting mean power of an interference signal generated by the optical coupling means; wherein the control means performs a function of setting a reference value to mean power of the interference signal, output from the second optical power detecting means when highest power is detected by the first optical power detecting means, and correcting the bias voltage so that the mean power of the interference signal is equal to the reference value.

Preferably, in the bias voltage automatic correction apparatus, the control means may be operated so that it compares the set reference value with the mean power output from the second optical power detecting means, decreases the bias voltage if the mean power is less than the reference value, increases the bias voltage if the mean power is greater than the reference value, and maintains the bias voltage if the mean power is equal to the reference value.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
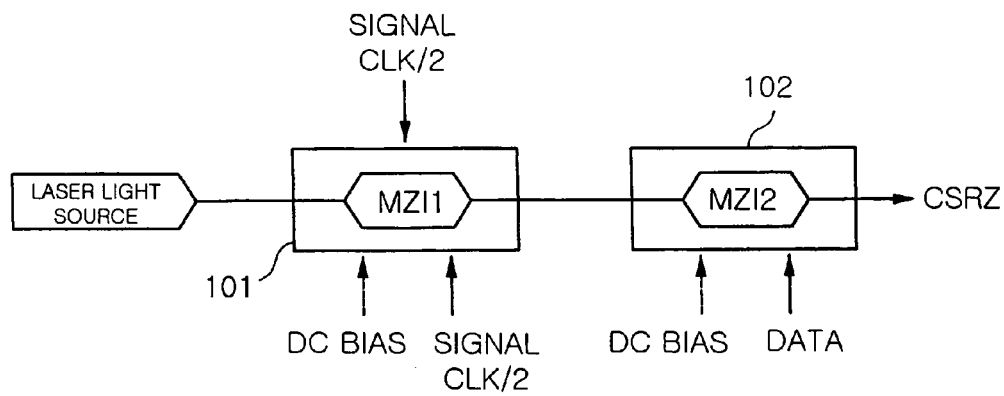
FIG. 1 is a view showing the basic construction of a CSRZ modulator.
Figure 2:
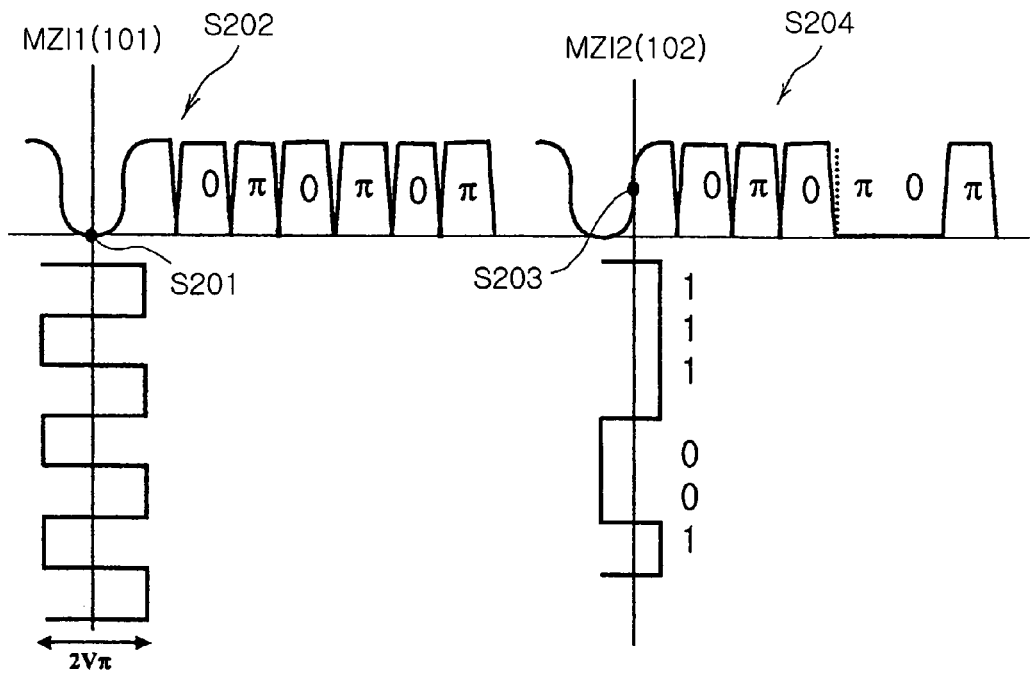
FIG. 2 is a graph showing the operating principles of the CSRZ modulator.

Hereinafter, an apparatus and method for automatically correcting a bias voltage for a carrier suppressed pulse generating modulator using the phase distribution of the output pulse, according to embodiments of the present invention will be described in detail with reference to the attached drawings.

Reference now should be made to the drawings, in which the same reference numerals are used throughout the different drawings to designate the same or similar components.

FIGS. 3(a) to (f) is a graph showing a relationship between variations in the position of a DC bias voltage and variations in an output signal of a CSRZ modulator, that is, the first external modulator 101 shown in FIG. 1. Referring to FIGS. 3(a) to (f), when the bias voltage is located at an optimal point P1, the pulse shape of the output signal of the first external modulator 101 and the phase variation thereof are ideally shown as represented in graphs of FIGS. 3(a) and (b), respectively.

Figure 3:
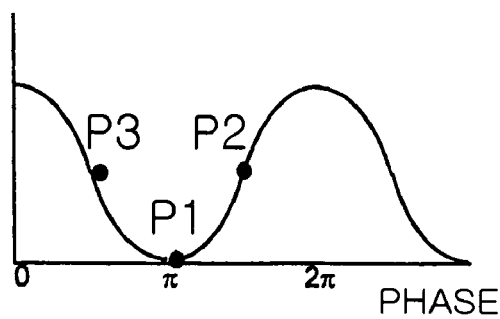
FIGS. 3(a) to 3(f) are graphs showing the principles of the automatic correction of a bias voltage according to the present invention.
Figure 3:
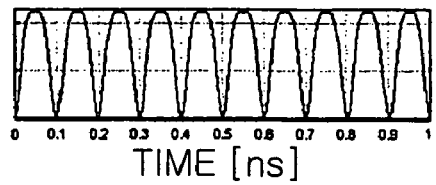
Figure 3:
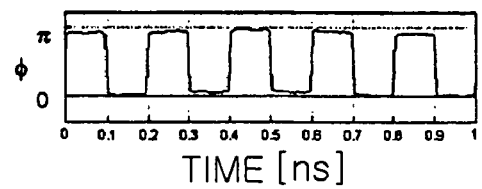
Figure 3:
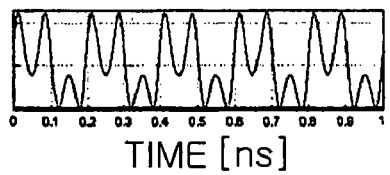
Figure 3:
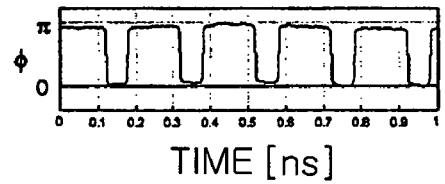
Figure 3:
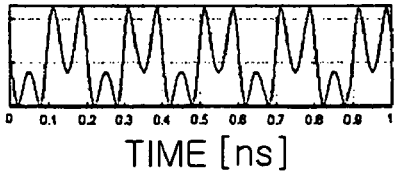
Figure 3:
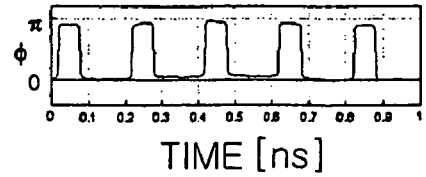

However, if the bias voltage varies from the optimal point P1 by $+V\pi/2$ to a point P2, the output signal of the first external modulator 101 has a pulse shape shown in a graph of FIG. 3(c), and a phase distribution shown in a graph of FIG. 3(d). As shown in FIG. 3(c), due to the distortion of the pulse shape, the mean power of the output signal of the first external modulator 101 greatly decreases compared to that of the output signal at the point P1. Further, the phase distribution of the output signal forms asymmetry in which the ranges of 180 degrees are widened and the ranges of 0 degrees are narrowed.

On the contrary, when the bias voltage varies from the optimal point P1 by $-V\pi/2$ to a point P3, the output signal of the first external modulator 101 has a pulse shape shown in a graph of FIG. 3(e) and a phase distribution shown in a graph of FIG. 3(f). Similar to the above case, the mean power of the output pulse signal of the first external modulator 101 decreases compared to the case where the bias voltage obtained at the point P1 is applied. In contrast to the above case, the phase distribution shows that the ranges of 0 degrees are widened and the ranges of 180 degrees are narrowed.

The apparatus and method for automatically correcting a bias voltage according to the present invention detects an optimal bias voltage and stabilizes the bias voltage using the shape and phase variation characteristics of the output pulse signal according to variations in the bias voltage. The principles of the stabilization of the bias voltage are described below.

Figure 4:
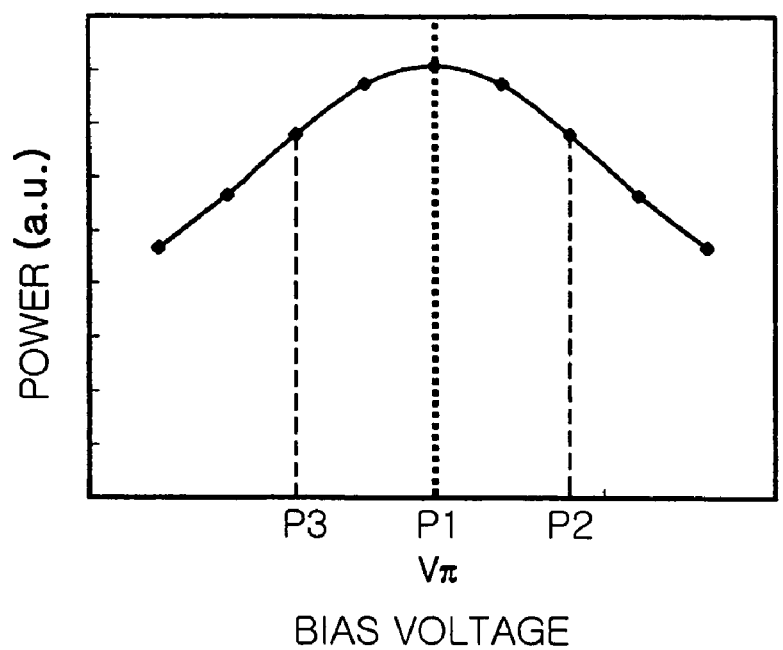
FIG. 4 is a graph showing variations in the mean power of an output signal of the CSRZ modulator according to the variations in a bias voltage in the CSRZ modulator of FIG. 1.

FIG. 4 is a graph showing variations in the mean power of the output pulse signal of the CSRZ modulator according to the variations in a bias voltage in the CSRZ modulator, in which the mean power of the output pulse signal is highest when the bias voltage has the optimum value P1, and is decreased in proportion to the absolute deviation of the bias voltage. That is, the variations in the mean power of the output pulse signal of the CSRZ modulator form lateral symmetry with respect to the optimal value of the bias voltage. In other words, when the mean power of the output pulse signal of the CSRZ modulator is highest, the optimal bias voltage is applied to the CSRZ modulator.

Therefore, the present invention measures the mean output power of the first external modulator 101 while varying the bias voltage, and detects a bias voltage obtained when the mean output power is highest.

Further, when the bias voltage varies during the operation of the CSRZ modulator, it must be determined whether the bias voltage increases or decreases from the optimal value so as to stabilize the bias voltage again to be the optimal value. Therefore, the variations in the mean power are symmetrical with respect to the optimal point, as shown in FIG. 4, so that it is difficult to recognize the varying direction of the bias voltage. Therefore, the present invention detects the varying direction (that is, increasing or decreasing direction) using the phase information of the output signal from the CSRZ modulator.

If the phase variations of FIGS. 3d and 3f having opposite varying directions are compared to each other, it can be seen that the phase distribution of the output signal varies depending on the varying directions of the bias voltage. That is, if the phase of the laser beam are compared to each other, the ranges having a phase difference of 180 degrees and the ranges having a phase difference of 0 degrees are symmetrical with respect to each other when the bias voltage has the optimal value. In contrast, ranges having a phase difference of 180 degrees are widened in FIG. 3(d), while the ranges having a phase difference of 0 degrees are widened in FIG. 3(f).

Therefore, if the bias voltage varies, the output signal of the first external modulator 101 and the laser beam interfere with each other, thus changing the output power of an optical coupler depending on the phase difference.

Figure 5:
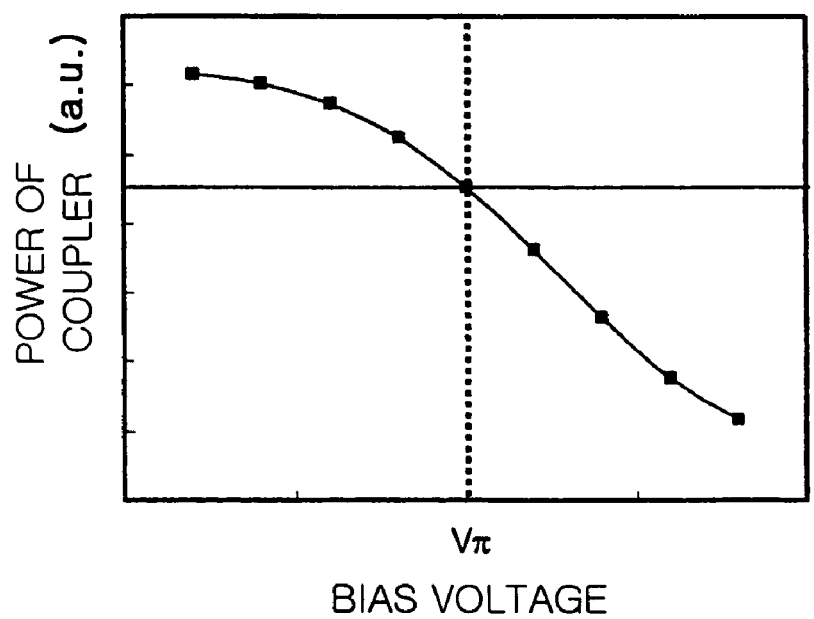
FIG. 5 is a graph showing variations in the output power, occurring after the interference of a laser beam with the output signal, according to variations in the bias voltage in the CSRZ modulator of FIG. 1.

FIG. 5 is a graph showing variations in the output power of an optical coupler according to the variations in the bias voltage in the CSRZ modulator. Referring to FIG. 5, if it is assumed that the intensity of the output power of the optical coupler at the optimal bias voltage (=Vπ) is a reference, the output power of the optical coupler decreases compared to that obtained at the optimal bias voltage as the bias voltage increases, while the output power thereof increases compared to that obtained at the optimal bias voltage as the bias voltage decreases.

Therefore, after detecting the output power of the optical coupler, obtained when the bias voltage has the optimal value, in advance and setting a reference value to the output power, the present invention compares the current output power of the optical coupler with the reference value when the bias voltage varies, and then determines a direction in which the bias voltage is to be corrected according to whether the output power of the optical coupler decreases or increases.

Figure 6:
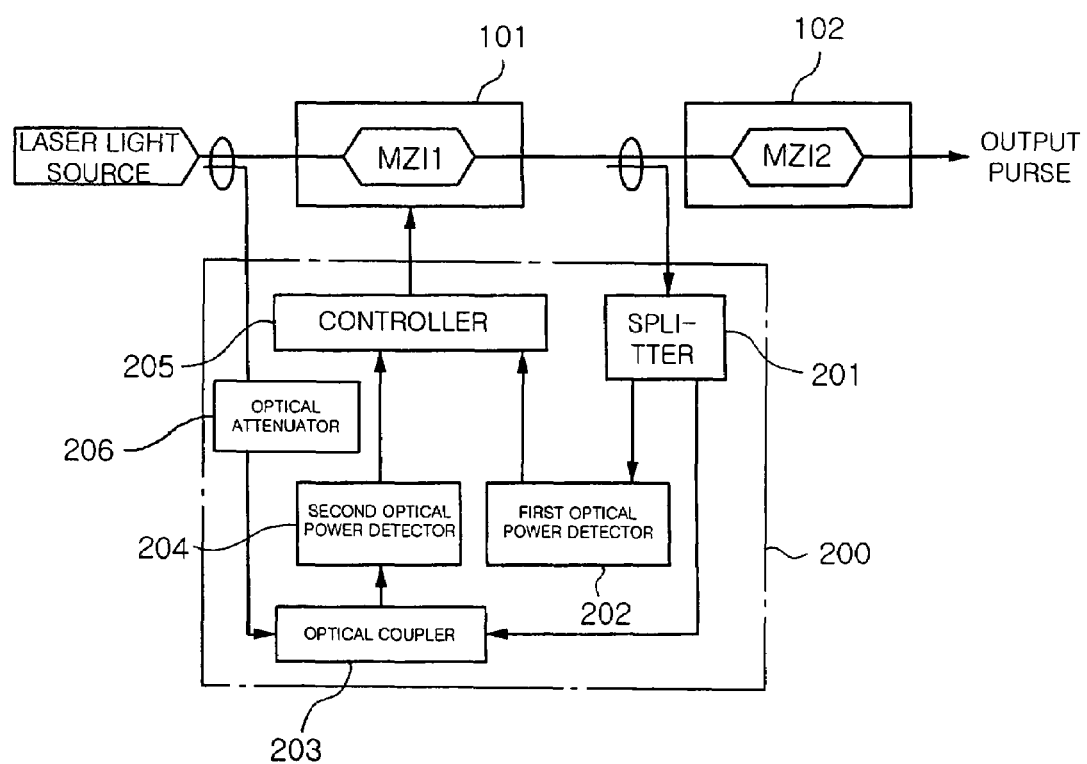
FIG. 6 is a block diagram of an apparatus for automatically correcting a bias voltage according to the present invention.

FIG. 6 is a block diagram of an apparatus for automatically correcting a bias voltage using the principles of the correction of the bias voltage for the above-described CSRZ modulator according to the present invention.

Referring to FIG. 6, the bias voltage automatic correction apparatus of the present invention includes a polarization maintained optical splitter 201, a first optical power detector 202, an polarization maintained optical coupler 203, a second optical power detector 204, a controller 205, and an optical attenuator 206. In this apparatus, polarization maintained optical fibers and optical components are used to reduce the dependency of polarization on interference process. The splitter 201 divides an optical signal output from the first external modulator 101, and ouput the first optical power detector 202 and optical coupler 203. The first optical power detector 202 detects the power of the optical signal that is output from the first external modulator 101 through the splitter 201. The optical coupler 203 allows the optical signal, output from the first external modulator 101 through the splitter 201, and the laser beam, emitted from the laser light source, to interfere with each other, and generates an interference signal. In this process, the power of the laser beam is equal to the power output from the splitter by adjusting the optical attenuator 206. The second optical power detector 204 measures the power of the interference signal output from the optical coupler 203. The controller 205 sets an optimal bias voltage to a bias voltage that is obtained when the power value output from the first optical power detector 202 is highest by varying the bias voltage applied to the first external modulator 101 at the time of initial operation and applies the optimal bias voltage to the first external modulator. Further, the controller 205 determines the varying direction of the bias voltage by examining the variations in the output power of the interference signal detected by the second optical power detector 204 on the basis of the output power of the interference signal obtained when the power value output from the first optical power detector 202 is highest, and then corrects the bias voltage depending on the varying direction of the bias voltage.

Figure 7:
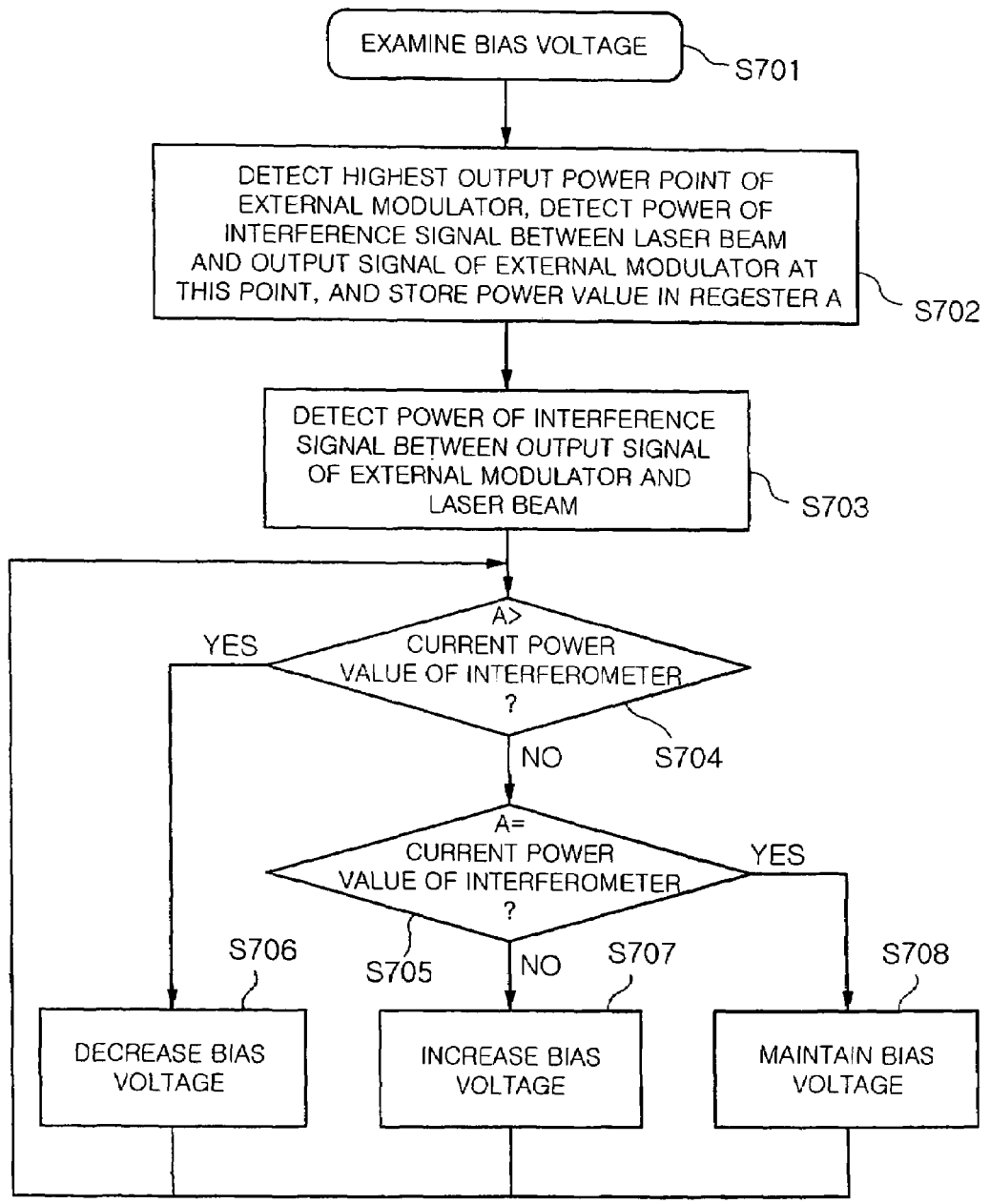
FIG. 7 is a flowchart of a method of automatically correcting a bias voltage according to the present invention.

FIG. 7 is a flowchart of a method of automatically correcting a bias voltage according to the present invention, in which the method is related to a control process executed by the controller 205 of FIG. 6.

With reference to FIGS. 6 and 7, the operations of the apparatus and method for automatically correcting a bias voltage of the present invention are described.

As shown in FIG. 6, the bias voltage automatic correction apparatus of the present invention is constructed so that the output signal of a corresponding CSRZ modulator, that is, the first external modulator 101, and the laser beam are applied to the automatic correction apparatus, and the bias voltage is applied to the first external modulator 101.

In this state, the splitter 201 divides the output optical signal of the first external modulator 101 and applies a divided optical signal to the first optical power detector 202 and the optical coupler 203. The optical coupler 203 generates an interference signal by allowing the externally applied laser beam (equal to continuous laser beam input to the first external modulator 101) and the output optical signal of the first external modulator 101, output through the splitter 201, to interfere with each other. In this interference process, each input power of the optical coupler 203 should be the same by adjusting the optical attenuator 206. Also, the polarization state of each input signal should be the same using the polarization maintained components and fibers. Further, the power of the output optical signal of the first external modulator 101, output through the splitter 201, and the power of the interference signal generated by the optical coupler 203 are detected by the first and second optical power detectors 202 and 204, respectively, and then are input to the controller 205.

Further, a process of setting the optimal value of the bias voltage and stabilizing the bias voltage is executed by the control operation of the controller 205, which is described below.

First, a procedure of automatically correcting a bias voltage starts by detecting an optimal point of the bias voltage for the external modulator 101, to which the bias voltage is applied, before the normal operation of the first external modulator 101.

That is, the controller 205 examines the power of the output signal of the first external modulator 101 detected by the first optical power detector 202 while varying the DC bias voltage applied to the first external modulator 101 from a minimum value to a maximum value at step S701. When the power value of the output signal is highest, the power of the interference signal between the output signal and the laser beam, which is detected by the second optical power detector 204, is stored in a predetermined location (a first register: A) at step S702. The power value A stored in the first register becomes a reference value which will be used to stabilize the bias voltage later.

As described above, after the power value of the interference signal between the output signal of the first external modulator 101 and the laser beam is detected at the optimal bias point, the control unit 205 corrects the bias voltage in real time so that a power value output from the second optical power detector 204 is equal to the power value A stored in the first register.

That is, during the normal operation of the first external modulator 101, the controller 205 compares the power value A stored in the first register with the output power value of the second optical power detector 204, detected at the present time at step S703, so as to stabilize the bias voltage at step S704.

As a result of the comparison, if the power value A stored in the first register is greater than the current power value output from the second optical power detector 204, that is, the current power value of the interference signal output from the optical coupler 203, the controller 205 decreases the bias voltage by a unit value because the bias voltage has increased compared to the optimal value, as shown in a graph of FIG. 5, at step S706.

Further, as a result of the comparison, if the power value A stored in the first register is not greater than the current power value output from the second optical power detector 204, that is, the current power value of the interference signal output from the optical coupler 203, the controller 205 determines whether the power value A stored in the first register is equal to the current power value output from the second optical power detector 204 at step S705.

As a result of the second comparison, if the power value A stored in the first register is not equal to the current power value output from the second optical power detector 204, it is recognized that the power value A stored in the first register is less than the current power value output from the second optical power detector 204 and then the current bias voltage has decreased compared to the optimal bias voltage, as shown in the graph of FIG. 5. Therefore, in order to correct the decreased bias voltage, the controller 205 increases the bias voltage by a unit voltage at step S707.

Further, as a result of the second comparison, if the power value A stored in the first register is equal to the current power value output from the second optical power detector 204, the controller 205 maintains the current bias voltage applied to the first external modulator 101 without change, because the optimal bias voltage is currently applied at step S708.

Through the above process, the present invention can detect the optimal value of the bias voltage applied to the first external modulator 101, and consistently stabilize the bias voltage as the set optimal value even during the operation of the first external modulator.

As described above, the present invention provides an apparatus and method for automatically correcting a bias voltage for a carrier suppressed pulse generating modulator using the phase distribution of output pulse, which can automatically detect an optimal bias voltage for the carrier suppressed pulse generating modulator in CSRZ modulation, and consistently apply the detected optimal bias voltage to the modulator, thus stabilizing the bias voltage. Further, the present invention is advantageous in that it can apply a stabilized bias voltage to the carrier suppressed pulse generating modulator used in the CSRZ modulation through the use of a phase distribution of the output pulse without requiring an additional light source or a complicated design, thus stabilizing a CSRZ modulator.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of automatically correcting a bias voltage for a modulator used to generate carrier suppressed pulses, the modulator receiving a continuous laser beam and generating the carrier suppressed pulses, the method comprising the steps of:
   a) setting an optimal bias voltage for the modulator to a bias voltage that is obtained when mean power of an optical signal output from the modulator is highest;
   b) applying the set optimal bias voltage to the modulator; and
   c) detecting variations in phase of the output optical signal of the modulator during an operation of the modulator by detecting variations in power of an interference signal between the output signal of the modulator and the laser beam, and maintaining the set optimal bias voltage by increasing or decreasing the bias voltage applied to the modulator on the basis of the detected phase variations, thus stabilizing the bias voltage.

2. The bias voltage automatic correction method according to claim 1, wherein the step a) comprises the steps of:
   a1) applying the bias voltage to the modulator while varying the bias voltage from a minimum value to a maximum value;
   a2) detecting mean power of optical signals output from the modulator with respect to the varied bias voltages; and
   a3) setting the optimal bias voltage to a bias voltage that is obtained when the mean power is highest.

3. The bias voltage automatic correction method according to claim 1, wherein the step c) comprises the steps of:
   c1) setting a reference value to mean power of the interference signal between the output optical signal of the modulator and the laser beam that is obtained when the optimal bias voltage set at step a) is applied; and
   c2) adjusting the bias voltage so that the mean power of the interference signal between the output optical signal of the modulator and the laser beam is maintained at the set reference value during the operation of the modulator.

4. The bias voltage automatic correction method according to claim 3, wherein the step c2) comprises the steps of:

c2-1) allowing the output optical signal of the modulator to interfere with the laser beam to generate the interference signal during the operation of the modulator, and detecting the mean power of the interference signal;

c2-2) comparing the detected mean power of the interference signal with the set reference value;

c2-3) decreasing the bias voltage applied to the modulator by a unit value if the detected mean power is less than the reference value as a result of the comparison;

c2-4) increasing the bias voltage applied to the modulator by a unit value if the detected mean power is greater than the reference value as a result of the comparison; and c2-5) maintaining the bias voltage applied to the modulator if the detected mean power is equal to the reference value as a result of the comparison;

wherein steps c2-1) to c2-5) are repeatedly performed during the operation of the modulator.

5. An apparatus for automatically correcting a bias voltage for a modulator used to generate carrier suppressed pulses, the modulator receiving a continuous laser beam and generating the carrier suppressed pulses, comprising:

splitting means for dividing an optical signal output from the modulator;

first optical power detecting means for detecting mean power of the optical signal output from the modulator through the splitting means;

control means for examining values detected by the first optical power detecting means while varying the bias voltage applied to the modulator from a minimum value to a maximum value, and then applying a bias voltage, obtained when the detected value is highest, to the modulator as the optimal bias voltage;

optical coupling means for allowing the laser beam applied to the modulator to interfere with the optical signal output from the splitting means; and second optical power detecting means for detecting mean power of an interference signal generated by the optical coupling means.

6. The bias voltage automatic correction apparatus according to claim 5, wherein the control means performs a function of setting a reference value to mean power of the interference signal, output from the second optical power detecting means when the highest power is detected by the first optical power detecting means, and correcting the bias voltage so that the mean power of the interference signal is equal to the reference value.

7. The bias voltage automatic correction apparatus according to claim 6, wherein the control means is operated so that it compares the set reference value with the mean power output from the second optical power detecting means, decreases the bias voltage if the mean power is less than the reference value, increases the bias voltage if the mean power is greater than the reference value, and maintains the bias voltage is the mean power is equal to the reference value.

8. The bias voltage automatic correction apparatus according to claim 6, further comprising:

attenuation means for adjusting the level of the laser beam to equal with level of the optical signal output from the splitting means.

9. The bias voltage automatic correction apparatus according to claim 6, wherein the splitting means is the polarization maintained components and fibers to be the same polarization state of each input signal of optical coupling means.

* * * * *